United States Patent [19]

Pearce et al.

[11] Patent Number: 4,629,312

[45] Date of Patent: Dec. 16, 1986

[54] THERMAL MARKING SYSTEM FOR PHOTOGRAPHIC MEDIA

[75] Inventors: Michael Pearce, Littleton; D. Daniel Entingh, Denver, both of Colo.

[73] Assignee: Lucht Engineering, Inc., Minneapolis, Minn.

[21] Appl. No.: 783,089

[22] Filed: Oct. 2, 1985

[51] Int. Cl.[4] ............................................. G03B 29/00
[52] U.S. Cl. .................................. 355/29; 346/76 PH; 355/41; 355/50
[58] Field of Search .................... 83/575, 635, 71, 214, 83/371; 234/28, 38, 63; 346/76 PH; 355/39–41, 50, 53, 54, 29, 46, 71

[56] References Cited

U.S. PATENT DOCUMENTS

| 3,947,109 | 3/1976 | Kinder et al. | 355/29 |
| 3,951,545 | 4/1976 | Lucht | 355/46 |
| 4,073,588 | 2/1978 | Zangenfeind et al. | 355/50 X |
| 4,239,377 | 12/1980 | Rasmussen, Jr. | 355/29 |
| 4,264,197 | 4/1981 | Pone et al. | 355/50 X |
| 4,403,854 | 9/1983 | Von Stein et al. | 355/41 |
| 4,506,824 | 3/1985 | Bartz | 234/28 |
| 4,531,135 | 7/1985 | Toshima | 346/76 PH |

Primary Examiner—Richard A. Wintercorn
Attorney, Agent, or Firm—Kinney & Lange

[57] ABSTRACT

A photographic printer of the type wherein a web of photographic material is advanced to and from an exposure station and wherein individual exposure areas of the photographic material are selectively marked by a thermal marking system. The thermal marking system of the present invention includes a thermally activated marking tape and a thermal print head which selectively applies thermal energy to portions of the tape. A frictional engagement between the photographic material and tape results in a movement of the tape with the photographic media when the media is driven through the printer. In a preferred embodiment, the friction between the tape and media is selectively established by intermittently establishing an intimate contact between them.

13 Claims, 2 Drawing Figures

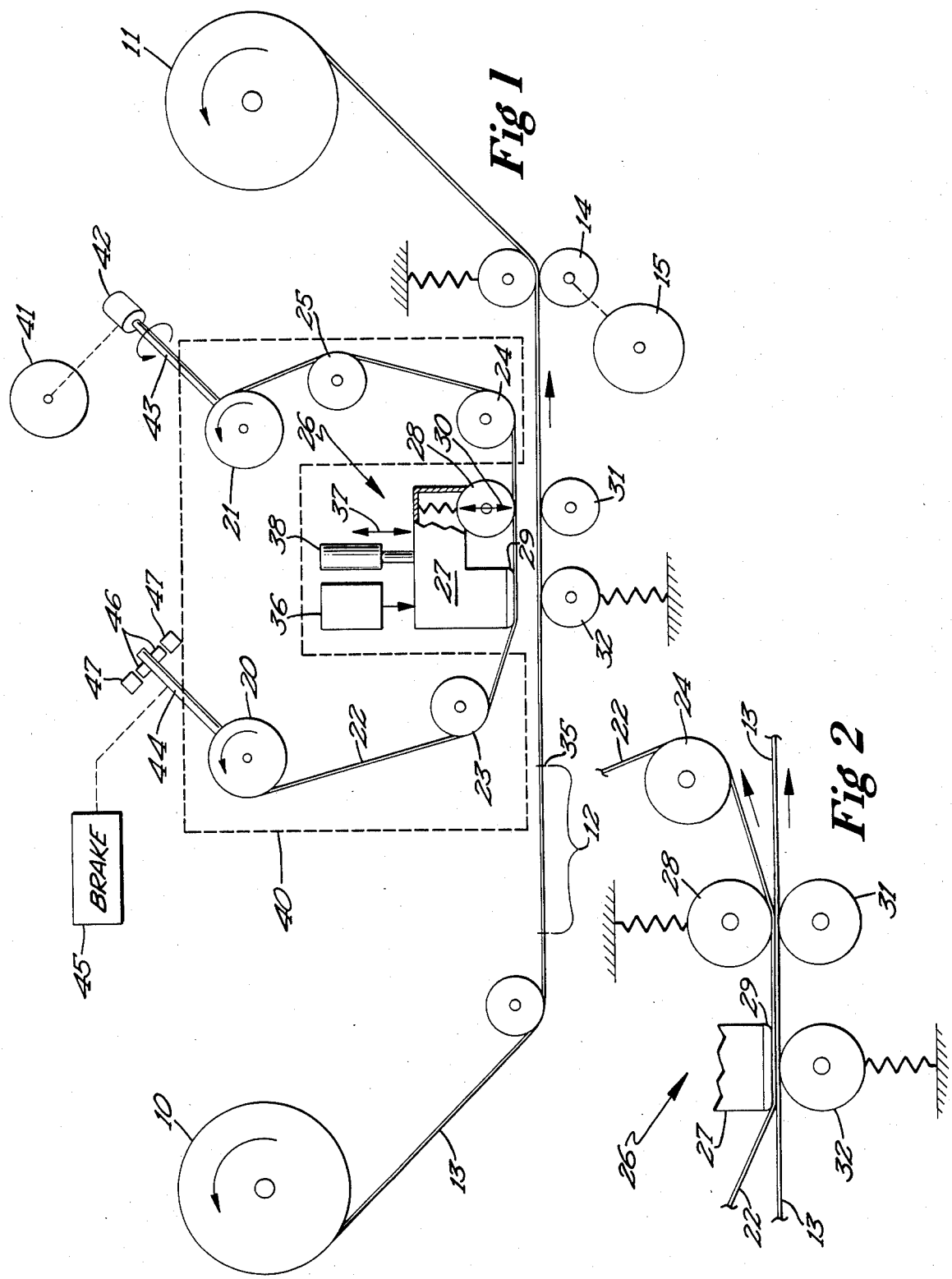

THERMAL MARKING SYSTEM FOR PHOTOGRAPHIC MEDIA

BACKGROUND OF THE INVENTION

1. Field of the Invention

The present invention relates to photographic printers and, particularly, to a system for thermally marking individual areas of photographic media exposed by such printers.

2. Description of the Prior Art

Photographic printers are known to the prior art. Automatic printers typically include supply and take-up rollers for photosensitive photographic media and a mechanism to automatically advance the media through an exposure station. The image to be exposed is established in known manner and projected on the photographic media in the exposure station. A shutter is employed to control the exposure.

An example of the type of printer discussed above is disclosed in U.S. Pat. No. 3,951,545 issued Apr. 20, 1976 in the name of Orren J. Lucht for PHOTOGRAPHIC PRINT APPARATUS which is commonly owned with the present invention and which is hereby incorporated by reference. The printer of this patent employs an interchangeable lens assembly formed with stacked, alternative lens configurations. That is, the different lens configurations are spaced from each other along the general direction of the printer optical path. They are movable, within the lens assembly, between first and second positions—one of those positions being within the optical path of the printer with the other being without the optical path. Selectively actuated plungers are operative to position the desired lens configuration within the printer's optical path.

The output of the printer discussed above is a roll of exposed photographic media which, when processed, produces a roll of media bearing photographic prints of varying sizes. That is, each exposure results in exposure areas of varying sizes with one or more print areas within each exposure area, all dependent on the lens configuration employed.

The size variation and exposure areas noted above, as well as the variation on the number of prints within each exposure area has complicated the automatic separation or cutting of one print from another. For example, U.S. Pat. No. 4,239,377 issued Dec. 16, 1980 in the name of William R. Rasmussen, Jr. for a PHOTOGRAPHIC PRINTER discloses a marking system that indicates the location of the border between adjacent exposure areas. This allows an automatic separation of one exposure area from another, as by cutting, for example. This marking system, however, indicates only the location of the border between adjacent exposure areas without providing any indication as to how individual print areas are arranged within the exposure area.

Another marking system is disclosed in U.S. Pat. No. 4,506,824 issued Mar. 26, 1985, in the name of Stephen A. Bartz for PAPER CUTTER. The Bartz marking system provides a code which identifies a particular array of print areas being exposed. Thus, the use of the Bartz system allows a more fully automated cutting operation which contributes to overall system efficiency.

In the cutting operation, the marking or coding of the two noted patents is typically obliterated or removed. Thus, after cutting, these systems may not provide an effective identification of a particular print. To provide such an identification, some have turned to impact-type printers. However, such printers may damage the photographic material such that further automated handling is prevented or the print itself is damaged. The two marking system patents noted above are commonly owned with the present invention and are hereby incorporated by reference.

SUMMARY OF THE INVENTION

The present invention provides a thermal marking system for a photographic printer of the type wherein a web of photographic material is advanced to and from an exposure station. The photographic material may be advanced by conventional drive systems. In accordance with the present invention, a thermally activated marking tape is employed in conjunction with a thermal print head for selectively applying a desired code to the photographic material. This is accomplished by selectively applying thermal energy to portions of the tape as the tape is held in intimate contact with the photographic material. The code may contain any desired information and, preferably, contains human readable alphanumeric characters which convey such information as the date on which a print was exposed, a sequence number indicating the order in which the prints were exposed, batch or customer identifying indicia identifying those prints that are associated with each other, printer operating parameters such as color balance, etc.

In accordance with the present invention, the thermal tape moves, in intimate contact with the photographic material, past the printing head during the marking operation. In a preferred embodiment, an engagement is established between the photographic material and the tape with movement of the photographic material providing the driving impetus to the tape. The engagement between the photographic material and tape may be selectively established such that the tape moves only during selected interval during the advance sequence of the photographic material which reduces the amount of tape that passes the print head for a given number of exposure areas that pass through the printing station.

BRIEF DESCRIPTION OF THE DRAWINGS

FIG. 1 is an illustration, in partial cutaway, of a preferred embodiment of the present invention;

FIG. 2 is an enlarged view of a portion of the embodiment of FIG. 1.

DETAILED DESCRIPTION OF THE PREFERRED EMBODIMENTS

FIG. 1 illustrates a portion of a photographic printer of the type described in the incorporated patents including a supply reel 10 of unexposed photographic material, a take-up reel 11 for exposed photographic material and an exposure station included within bracket 12 in which the photographic material is exposed. In the embodiment illustrated, the photographic material is exposed from below while the web of photographic material extending between the supply and take-up reels, 10 and 11, respectively, is designated by numeral 13. The web of photographic material 13 is driven or advanced through the exposure area by a roller 14 driven by a motor 15 with an idler device 16 maintaining contact between the web 13 and roller 14, in known manner. The reels 10 and 11 may be driven, as desired or appropriate, as is well known to those familiar with the art.

In the embodiment illustrated in FIG. 1, the marking system of the present invention is positioned between the exposure station 12 and the the web drive system described above. The marking system includes a supply of thermally activated marking tape which may be in the form of a reel as indicated at 20 and a take-up reel 21 for expended tape. The tape is indicated at 22 and may be any known tape that is thermally activated so as to leave behind an appropriate marking. It has been found that a Mylar carrier having a thermally activated ink may be advantageously employed within the present invention.

Guide rollers 23-25 guide the tape 22 past a printing head designated generally at 26, with roller 24 establishing the "separation angle" between the tape 22 and web 13. The print head 26 includes a carrier or support 27 for a pinch roller 28 and a thermal printing element 29, the element 29 being described more fully below. The carrier 27 is partially cut away to show the pinch roller 28 and its spring bias within the print head 27 which allows movement relative to the head 27 as indicated by the double-headed arrow 30. An idler 31 is positioned in opposing relation to the pinch roller 28 while a spring-biased roller 32 is positioned in opposing relation to the printing element 29 to serve as a platen, both as described below. The "rest" position of the pinch roller 2B is toward the idler 31 with the pinch roller 2B being movable, against its bias, away from the idler 31. While the pinch roller 28 is shown as being spring biased, the idler 31 may be spring biased in addition, or as an alternative, to that biasing.

In operation, the system elements described to this point may be employed to thermally mark the nonemulsion side of the photographic web 13 with the cooperation of the idler 31. For this purpose, the print head 27 is lowered such that the pinch roller 28 establishes an intimate contact between the tape 22 and the photographic web 13. In a manner to be described below, the tape 22 will be advanced past the printing element 29 by the web 13 when the web 13 is advanced from the reel 10 to the reel 11 through the exposure area 12. As is common in the art, the leading edge 35 of the exposure area 12 may be employed as a reference point such that an exposure area exposed within the exposure station 12 may be advanced a known distance to position that exposure area beneath the thermal element 29 for the marking of any desired characteristics on the back of that exposure area. Thus, the drive mechanism for the web 13 provides the motive power for driving the tape 22 past the print head 26 and thermal element 29. The indicia or other markings may be established by a control 36 operatively connected to the thermal element 29. In a preferred embodiment, the thermal element 29 is a nine element straight line dot matrix in which selective activation of the elements forms the desired character or code, in known manner.

In a preferred embodiment, the carrier 27 is selectively movable in the direction of the double-headed arrow 37, as by a solenoid 38, for example. In this manner, the intimate contact between web 13 and tape 22 established by the pinch roller 28 and idler 31 may be selectively established and, accordingly, engagement between them may be selectively established such that the tape 22 is advanced only during that interval when marking is desired. Thus, tape 22 may be controlled so as to be advanced only during a printing operation.

The supply reels 20 and 21 for the tape 22 may be contained in a cassette as indicated by the dashed line 40. The reel 21 may be driven by a motor 41 via a clutch 42 and shaft 43. The reel 20 may be connected by a shaft 44 to a brake 45 with the shaft 44 carrying magnets 46 which rotate between Hall effect devices 47. Alternatively, the brake 45 may act on the tape 22. In either case, the motor 41 may be continuously driven with the brake 45 controlling the advance of the tape 22 past the printing element 29, as when printing is desired. However, it is believed preferable that the motor 41 be operated intermittently and may be operated only during an advance of the tape 22. Such control of the motor 41 is well known. The magnets 46 and Hall effect devices 47 may be employed to monitor the amount of tape remaining on the reel 20. For example, as tape is withdrawn from the reel 20 the speed of the shaft will vary. This variation can be detected to indicate that a change in cartridge is necessary. In addition, in the event that the tape 22 breaks while motor 41 is running, the shaft 44 will stop its rotation which can also be detected by the Hall effect devices 47 to give an appropriate indication that service is necessary.

FIG. 2 illustrates a portion of the embodiment of FIG. 1 and, specifically, shows the intimate contact established between the web 13 and tape 22 when the tape 22 is being driven. Preferably, the contact force between the pinch roller 28 and idler 31 is greater than that between thermal element 29 and platen 32. The intimate contact between the tape 22 and web 13 establishes friction and an intermolecular attraction both of which provide forces, on movement of the web, which contribute to the motion of the tape. In addition, a thermal bonding force is also established during web 13 movement which results from the intimate contact and action of the printing element 29 during the marking operation.

Obviously, many modifications and variations of the present invention are possible in light of the above teachings. For example, any desired information can be printed or marked while the system may be operated with either a permanent contact between the tape 22 and web 13 or an intermittent contact, as described. It is therefore to be understood that, the invention may be practiced otherwise than as specifically described.

What is claimed is:

1. In a photographic printer of the type wherein a web of photographic material is advanced to and from an exposure station by drive means and having means for selectively marking individual exposure areas of said photographic material, the improvement wherein said marking means comprises:

thermally activated marking tape means;

thermal print element means for selectively applying thermal energy to portions of said tape means; and means establishing engagement between said photographic material and said tape means for driving said tape means past said thermal print element means on movement of said photographic material.

2. The photographic printer of claim 1 wherein said engagement establishing means comprises means for selectively establishing said engagement.

3. The photographic printer of claim 2 wherein said engagement establishing means comprises idler means and pinch means, one of said idler and pinch means being in contact with said photographic material and the other of said idler and pinch means being in contact with said tape means.

4. The photographic printer of claim 3 wherein at least one of said idler and pinch means is movable relative to the other for establishing said engagement.

5. The photographic printer of claim 4 wherein said pinch means and said thermal print element means are commonly carried by movable print head means, said pinch means being resiliently biased toward a rest position within said print head means.

6. The photographic printer of claim 5 further comprising platen means in opposing relation to said thermal print element means.

7. The photographic printer of claim 6 wherein said thermal print element means comprises dot matrix means.

8. The photographic printer of claim 7 further comprising cartridge means including supply, take-up and guide means for said tape means.

9. The photographic printer of claim 8 further comprising means for determining the amount of unused tape means within said cartridge means.

10. The photographic printer of claim 9 wherein said supply and take-up means comprise reel means and further comprising motive means, including clutch means, for driving said take-up reel means and brake means for stopping said supply reel means.

11. The photographic printer of claim 10 wherein said motive means further comprises selectively operable motor means.

12. The photographic printer of claim 11 wherein said selectively operable motor means comprises stepper motor means.

13. In a photographic printer of the type wherein a web of photographic material is advanced to and from an exposure station by drive means and having means for selectively marking individual exposure areas of said photographic material, the improvement wherein said marking means comprises:

thermally activated marking tape means;

thermal print element means for selectively applying thermal energy to portions of said tape means; and means selectively establishing intimate contact between said photographic material and said tape means, at least in the region of said thermal print element means, for driving said tape means past said thermal print element means by advancing said photographic material.

* * * * *